(12) United States Patent
Pervan et al.

(10) Patent No.: US 10,493,729 B2
(45) Date of Patent: *Dec. 3, 2019

(54) METHOD OF PRODUCING A BUILDING PANEL AND A BUILDING PANEL

(71) Applicant: VALINGE INNOVATION AB, Viken (SE)

(72) Inventors: Darko Pervan, Viken (SE); Niclas Hakansson, Viken (SE); Hans Persson, Perstorp (SE); Marcus Bergelin, Lerberget (SE)

(73) Assignee: VALINGE INNOVATION AB, Viken (SE)

(*) Notice: Subject to any disclaimer, the term of this patent is extended or adjusted under 35 U.S.C. 154(b) by 494 days.

This patent is subject to a terminal disclaimer.

(21) Appl. No.: 14/884,255

(22) Filed: Oct. 15, 2015

(65) Prior Publication Data

US 2016/0031189 A1 Feb. 4, 2016

Related U.S. Application Data

(63) Continuation of application No. 14/151,973, filed on Jan. 10, 2014, now Pat. No. 9,181,698.

(Continued)

(51) Int. Cl.
*B32B 21/06* (2006.01)
*B32B 21/08* (2006.01)
(Continued)

(52) U.S. Cl.
CPC .............. *B32B 21/06* (2013.01); *B32B 21/02* (2013.01); *B32B 37/0038* (2013.01);
(Continued)

(58) Field of Classification Search
CPC .................. B32B 2038/166; B32B 2038/0056
See application file for complete search history.

(56) References Cited

U.S. PATENT DOCUMENTS

| 2,587,064 A | 2/1952 | Rapson |
| 2,831,793 A | 4/1958 | Elmendorf |

(Continued)

FOREIGN PATENT DOCUMENTS

| AU | 80284/75 | 6/1975 |
| CA | 2 557 096 A1 | 7/2005 |

(Continued)

OTHER PUBLICATIONS

International Search Report issued in corresponding PCT/SE2014/050015, dated Apr. 7, 2014, 6 pages, ISA/SE Patent-och registreringsverket, Stockholm, SE.

(Continued)

*Primary Examiner* — Scott W Dodds
(74) *Attorney, Agent, or Firm* — Buchanan Ingersoll & Rooney P.C.

(57) ABSTRACT

A method of producing a building panel, including: providing a core, applying a balancing layer having a first moisture content on a first surface of the core, the balancing layer comprising a sheet impregnated with a thermosetting binder, applying a surface layer having a second moisture content on a second surface of the core, the surface layer comprising a thermosetting binder, adjusting the first moisture content of the balancing layer such that the first moisture content of the balancing layer is higher than the second moisture content of the surface layer prior to curing, and curing the surface layer and the balancing layer by applying heat and pressure. Also, a semi-finished product adapted to be cured for forming a building panel.

20 Claims, 4 Drawing Sheets

Related U.S. Application Data

(60) Provisional application No. 61/751,393, filed on Jan. 11, 2013.

(51) Int. Cl.

| | | |
|---|---|---|
| *E04C 2/24* | (2006.01) | |
| *B32B 37/00* | (2006.01) | |
| *E04C 2/40* | (2006.01) | |
| *B32B 21/02* | (2006.01) | |
| *B32B 37/18* | (2006.01) | |
| *B32B 38/00* | (2006.01) | |
| *B32B 38/16* | (2006.01) | |

(52) U.S. Cl.
CPC .............. *B32B 37/18* (2013.01); *E04C 2/246* (2013.01); *E04C 2/40* (2013.01); *B32B 2038/0056* (2013.01); *B32B 2038/0076* (2013.01); *B32B 2038/166* (2013.01); *B32B 2260/028* (2013.01); *B32B 2260/046* (2013.01); *B32B 2317/125* (2013.01); *B32B 2317/16* (2013.01); *B32B 2419/00* (2013.01); *B32B 2471/00* (2013.01); *B32B 2607/00* (2013.01); *B32B 2607/02* (2013.01); *Y10T 428/31964* (2015.04)

(56) References Cited

U.S. PATENT DOCUMENTS

| | | |
|---|---|---|
| 2,962,081 A | 11/1960 | Dobry et al. |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,373,070 A | 3/1968 | Fuerst |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,897,588 A | 7/1975 | Nohtomi |
| 3,914,359 A | 10/1975 | Bevan |
| 3,961,108 A | 6/1976 | Rosner et al. |
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,420,525 A | 12/1983 | Parks |
| 4,430,375 A | 2/1984 | Scher et al. |
| 4,474,920 A | 10/1984 | Kyminas et al. |
| 4,890,656 A | 1/1990 | Ohsumi et al. |
| 5,034,272 A | 7/1991 | Lindgren et al. |
| 5,040,582 A | 8/1991 | Hsu et al. |
| 5,206,066 A | 4/1993 | Horacek |
| 5,246,765 A | 9/1993 | Lussi et al. |
| 5,258,216 A | 11/1993 | Von Bonin et al. |
| 5,314,554 A | 5/1994 | Owens |
| 5,422,170 A | 6/1995 | Iwata et al. |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Shultz et al. |
| 5,925,296 A | 7/1999 | Leese |
| 5,942,072 A | 8/1999 | McKinnon |
| 6,036,137 A | 3/2000 | Myren |
| 6,103,377 A | 8/2000 | Clausi |
| 6,238,750 B1 | 5/2001 | Correll et al. |
| 6,324,809 B1 | 12/2001 | Nelson |
| 6,468,645 B1 | 10/2002 | Clausi |
| 6,521,326 B1 | 2/2003 | Fischer et al. |
| 6,537,610 B1 | 3/2003 | Springer et al. |
| 6,617,009 B1 | 9/2003 | Chen |
| 6,620,349 B1 | 9/2003 | Lopez |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,364,578 B2 | 7/2019 | Pervan |
| 10,392,812 B2 | 8/2019 | Pervan |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0208980 A1 | 11/2003 | Miller et al. |
| 2004/0123542 A1 | 7/2004 | Grafenauer |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2005/0003099 A1 | 1/2005 | Quist |
| 2005/0079780 A1 | 4/2005 | Rowe et al. |
| 2005/0193677 A1 | 9/2005 | Vogel |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0166516 A1 | 7/2007 | Kim et al. |
| 2007/0184244 A1 | 8/2007 | Doehring |

(56) References Cited

U.S. PATENT DOCUMENTS

| | | |
|---|---|---|
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1* | 10/2012 | Persson .............. C09D 7/70 428/535 |
| 2012/0264853 A1 | 10/2012 | Ziegler et al. |
| 2012/0288689 A1 | 11/2012 | Hansson et al. |
| 2012/0308774 A1 | 12/2012 | Persson et al. |
| 2013/0040118 A1 | 2/2013 | Buhlmann |
| 2013/0092314 A1 | 4/2013 | Ziegler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0329064 A1 | 11/2014 | Doehring |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0114495 A1 | 4/2016 | Pervan et al. |
| 2016/0186318 A1 | 6/2016 | Pervan et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Pervan et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284821 A1 | 9/2019 | Pervan |
| 2019/0292796 A1 | 9/2019 | Pervan et al. |

FOREIGN PATENT DOCUMENTS

| | | |
|---|---|---|
| CA | 2 852 656 A1 | 4/2013 |
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |

(56) References Cited

FOREIGN PATENT DOCUMENTS

| | | |
|---|---|---|
| JP | 2-229002 A | 9/1990 |
| JP | 11-291203 A | 10/1999 |
| JP | 2000-301684 A | 10/2000 |
| JP | 4162799 B2 | 10/2000 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| KR | 2002-0019815 A | 3/2002 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/084466 A2 | 7/2010 |
| WO | WO 2010/087752 A1 | 8/2010 |
| WO | WO 2010/094500 A1 | 8/2010 |
| WO | WO 2011/087422 A1 | 7/2011 |
| WO | WO 2011/087423 A1 | 7/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/141647 A1 | 10/2012 |
| WO | WO 2013/056745 A1 | 4/2013 |

OTHER PUBLICATIONS

Ayrilmis, Nadir, "Enhancement of dimensional stability and mechanical properties of light MDF by adding melamine resin impregnated paper waste," International Journal of Adhesion & Adhesives, 2012, pp. 45-49, vol. 33, ISSN 0143-7496, (article available online Nov. 10, 2011), Elsevier Ltd, NL.

BTLSR Toledo, Inc. website. http://www.btlresins.com/more.html. "Advantages to Using Powdered Resins," May 26, 2007, 2 pages, per the Internet Archive WayBackMachine.

Cavdar, A.D., et al., "Effect of waste melamine impregnated paper on properties of oriented strand board", Materials and Design, 2013, pp. 751-755, vol. 51, ISSN 0261-306, Elsevier Ltd., NL.

Floor Daily, "Shaw Laminates: Green by Design," Aug. 13, 2007, 1 pg, Dalton, GA.

Le Fur, X., et al., "Recycling melamine-impregnated paper waste as board adhesives," Holz als Roh-und Werkstoff, published online Oct. 26, 2004, pp. 419-423, vol. 62, Springer-Verlag, DE.

Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.

Odian, George, "Principles of Polymerization," 1991. 3rd Edition, 5 pages incl. pp. 122-123, John Wiley & Sons, Inc., New York, NY, USA.

Parquet International, "Digital Printing is still an expensive process," Mar. 2003, cover page/pp. 78-79, www.parkettmagazin.com.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Extended European Search Report issued in EP 14737757.6, dated Aug. 17, 2016, European Patent Office, Munich, DE, 5 pages.

U.S. Appl. No. 16/210,493, Hans Persson, Niclas Håkansson and Jan Jacobsson, filed Dec. 5, 2018.

U.S. Appl. No. 16/210,493, Persson, et al.

Persson, Hans, et al., U.S. Appl. No. 16/210,493 entitled "Powder Based Balancing Layer," filed in the U.S. Patent and Trademark Office on Dec. 5, 2018.

U.S. Appl. No. 12/270,257 Darko Pervan, Kent Lindgren, Jan Jacobsson, Niclas Håkansson, Eddy Boucké and Göran Ziegler filed Nov. 13, 2008 (Cited herein as US Patent Application Publication No. 2009/0155612 A1 of Jun. 18, 2009).

U.S. Appl. No. 14/516,957 Hans Persson and Peter Wingardh filed Oct. 17, 2014. (Cited herein as US Patent Application No. 2015/0111055 A1 of Apr. 23, 2015.

U.S. Appl. No. 14/738,274 Hans Persson, Niclas Håkansson and Jan Jacobsson filed Jun. 12, 2015 (Cited herein as US Patent Application Publication No. 2015/0275526 A1 of Oct. 1, 2015).

U.S. Appl. No. 15/704,634 Darko Pervan, Kent Lindgren, Jan Jacobsson, Eddy Boucké, Göran Ziegler and Niclas Håkansson filed Sep. 14, 2017 (cited herein as US Patent Application No. 2018/0002934 A1 of Jan. 4, 2018).

* cited by examiner

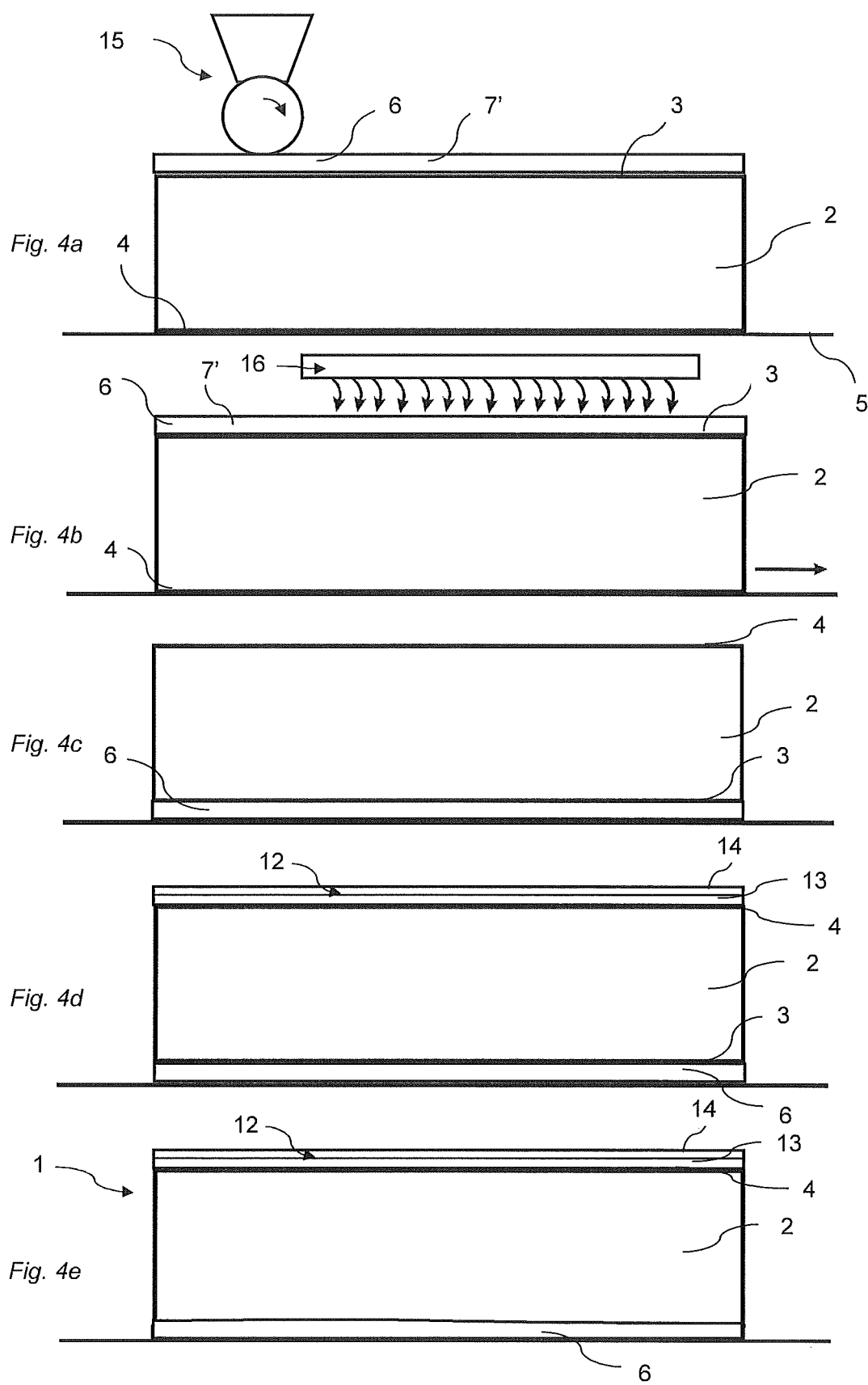

METHOD OF PRODUCING A BUILDING PANEL AND A BUILDING PANEL

CROSS REFERENCE TO RELATED APPLICATIONS

The present application is a continuation of U.S. application Ser. No. 14/151,973, filed on Jan. 10, 2014, which claims the benefit of U.S. Provisional Application No. 61/751,393, filed on Jan. 11, 2013. The entire contents of U.S. application Ser. No. 14/151,973 and U.S. Provisional Application No. 61/751,393 are hereby incorporated herein by reference in their entirety.

TECHNICAL FIELD

The present disclosure relates to a method of forming a balancing layer on a building panel, a semi-finished product and a building panel.

TECHNICAL BACKGROUND

Traditional laminated panels, intended to be used for e.g. flooring or furniture components, are generally produced by the following steps:
  applying a melamine formaldehyde resin impregnated paper as balancing layer on one face of a core of wood fibre based material, for example, HDF;
  applying a melamine formaldehyde resin impregnated printed decor paper on the other face of the core;
  applying a melamine formaldehyde resin impregnated transparent overlay paper with wear resistant particles, for example, aluminium oxide, on the décor paper; and
  curing the resin by applying heat and pressure in a continuous or discontinuous press to obtain a laminated product.

Typical press parameters are 40-60 bar pressure and a temperature of 160-200° C. with a pressing time of 8-45 seconds. The surface layer has generally a thickness of 0.1-0.2 mm, the thickness of the core varies between 6-12 mm and the balancing layer is about 0.1-0.2 mm thick.

This production method and product produced by such methods are generally referred to as the DPL process and DPL products (Direct Pressure Laminate).

Recently, building panels with a wood fibre based surface have been developed. Powder comprising wood fibres, a binder, preferably melamine formaldehyde resin, aluminium oxide particles and colour pigments are scattered on a core of a wood fibre based material such as HDF and pressed under heat and pressure in a continuous or discontinuous press to obtain a product with a paper free and solid surface layer. The press parameters are similar to DPL. A higher pressure of 40-80 bar and a pressing time of 15-45 seconds may be used when the surface is formed with deep embossing and a thickness of, for example, 0.4-0.6 mm. The pressing temperature is generally 150-200° C. Such wood fibre based floors, generally referred to as Wood Fibre Floors (WFF), have considerably better properties than traditional laminate floors since a thicker and more impact-resistant and wear-resistant surface with deep embossing may be produced in a cost efficient way.

Both DPL products and panels having a wood fibre based surface have a balancing layer arranged on the rear face of the core. The balancing layer may be a balancing paper or powder-based balancing layer comprising wood fibres and a binder. The core with the upper and lower layers is moved into a press and pressed under heat and pressure such that the layers are cured and attached to the core.

The layers on the front face and the rear face of the core are exposed to a first shrinking when the thermosetting resin in the upper and lower layer cures during pressing. The balancing layer at the rear face balances the tension that is created by the surface layer of the front face and the panel is substantially flat with a small convex backward bending when it leaves the press. Such first shrinking and balancing of the panel is below referred to as "pressing balancing". The second temperature shrinking, when the panels is cooled from about 150-200° C. to room temperature, is also balanced by the balancing layer and the panel is essentially flat. The second balancing is below referred to as "cooling balancing". A small convex backward bending is preferred since this counteracts upward bending of the edges in dry conditions when the relative humidity may go down to 20% or lower during wintertime.

A problem is that this essentially flat panel comprises tension forces caused by the shrinking of the surface and balancing layers during pressing and during cooling to room temperature.

The surface layer and the core will swell in summertime when the indoor humidity is high and shrink in wintertime when the indoor humidity is low. The panels will shrink and expand and a cupping of the edges may take place. The balancing layer is used to counteract such cupping. In the installed floor, the balancing layer is used to work as a diffusion barrier for moisture from the underlying floor, and to minimize the impact of the surrounding climate. Consequently, the balancing layer is adapted balance shrinking and expansion caused by both pressing, cooling and climate changes.

It is known that a balancing layer comprising a powder mix of wood fibres and a thermosetting binder can be used to balance the surface layer. A method for producing such a balancing layer is described in WO 2012/141647.

US 2010/0239820 describes a method of producing a laminated decorative plate wherein an unimpregnated decorative layer is applied onto a layer of glue arranged on the core. A counteracting layer is arranged on the other side of the core, and it is described that neutral paper with solid or liquid resin as a glue is suitable for the counteracting layer. The counteracting layer is adapted to prevent the finished plate from warping or bending as a result of influences of temperature and humidity.

WO 2010/084466 discloses a balancing layer substantially consisting of a synthetic material layer, which is free from material sheets. The synthetic material is provided in liquid form.

SUMMARY

It is an object of at least certain embodiments of the present invention to provide an improvement or alternative over the above described techniques and prior art.

A further object of at least certain embodiments of the present invention is to provide a method reducing the cost for providing a building panel with a balancing layer.

A further object of at least certain embodiments of the present invention is to reduce the amount of thermosetting binder in the balancing layer.

At least some of these and other objects and advantages that will be apparent from the description have been achieved by a method of producing a building panel. The method comprises:

providing a core, applying a balancing layer on a first surface of the core, wherein the balancing layer has a first moisture content and comprises a sheet impregnated with a thermosetting binder, applying a surface layer on a second surface of the core, wherein the surface layer has a second moisture content and comprises a thermosetting binder, adjusting the first moisture content of the balancing layer such that the first moisture content of the balancing layer is higher than the second moisture content of the surface layer prior to curing by applying heat and pressure, and curing the surface layer and the balancing layer by applying heat and pressure.

By moisture content is meant water present in any form.

The balancing layer is adapted to counteract shrinking forces formed by the surface layer during pressing and cooling such that the building panel remains essentially flat in room temperature after pressing. The shrinking forces formed by the thermosetting binder of the surface layer during pressing and curing are balanced or counteracted by the shrinking forced formed by the thermosetting binder of the balancing layer during pressing. By arranging a balancing layer on the core opposite the surface layer, the shrinking forces formed by the thermosetting binder in the surface layer and by the thermosetting binder in the balancing layer are balanced against each other.

An advantage of at least embodiments of the invention is that by adjusting the moisture content of the balancing layer to be higher than the moisture content of the surface layer prior to curing, for example, by applying water on the core and/or on the balancing layer, the balancing layer can balance larger shrinking forces formed by the surface layer during pressing and cooling. By increasing the moisture content of the balancing layer prior to curing, the amount of thermosetting binder of the balancing layer can be reduced. A thinner paper, i.e. a paper having reduced weight per square meter, can also be used. The reduced amount of the thermosetting binder of the balancing layer is compensated by the effects of the higher moisture content of the balancing layer.

Pressing tests show that a suitable moisture content in a balancing layer comprising a thermosetting binder such as melamine formaldehyde may increase the shrinking forces during curing and cooling and that this may be used to reduce the amount of the thermosetting binder in the balancing layer. It is preferred that the moisture content in the thermosetting binder of the balancing layer prior to pressing is higher than the general moisture content of about 4.5-6% that is the case when conventional impregnated paper is used as a balancing layer. The moisture content of the balancing layer should preferably exceed the moisture content of the surface layer. The moisture content of the balancing layer preferably exceeds 10% of the total weight of the balancing layer. In some application it may be an advantage to use even higher moisture contents, for example, exceeding 20%. The moisture content is measured prior to pressing. The moisture content in a conventional backing paper is usually limited by the fact that the papers are stacked on a pallet and too high moisture content causes sticking and single paper sheets cannot be taken from the pallet.

The moisture in the balancing layer contributes to the increased balancing capacity of the balancing layer in several ways. The moisture in the balancing layer facilitates and improves heat transfer from the heated press plates into the balancing layer, thus accelerating and/or increasing cross-linking of the thermosetting resin. The moisture content also influences curing of the thermosetting resin by increasing or facilitating floating of the thermosetting binder, which may result in a higher degree of cross-linking. The moisture content of the balancing layer may also influence the core of the building panel. The moisture content of the balancing layer may make the core, for example, a core of a wood-based material, more formable during pressing. A small convex backward bending of the core may be achieved, counteracting an upward bending of the edges of the surface layer. The method may comprise adjusting the moisture content of the balancing layer and/or the surface layer such that the moisture content of the balancing layer is higher than the moisture content of the surface layer.

The step of adjusting the first moisture content of the balancing layer may comprise applying water or steam to the first surface of the core prior to applying the balancing layer.

The step of adjusting the first moisture content of the balancing layer comprises applying water or steam to the balancing layer. Adjusting the first moisture content of the balancing layer may also be performed by applying water or steam to both the first surface of the core and to the balancing layer prior to curing by applying heat and pressure.

The first moisture content of the balancing layer may be about 6-30%, preferably 8-20% of the total weight of the balancing layer prior to curing.

The first moisture content of the balancing layer may exceed 10%, preferably exceeds 20%, more preferably exceeds 30%, of the total weight of the balancing layer.

The thermosetting binder may be of the same type in the surface layer and in the balancing layer.

The thermosetting binder of the surface layer and/or the balancing layer may be melamine formaldehyde resin. The thermosetting binder of the surface binder and/or the balancing layer may also be urea melamine formaldehyde or a combination of urea/melamine formaldehyde. Any other amino resin is also possible, such as phenol formaldehyde resin.

The sheet impregnated with the thermosetting binder may be a paper sheet impregnated with the thermosetting binder. The paper sheet is preferably a melamine formaldehyde impregnated paper.

The surface layer may comprise a décor paper, preferably a resin impregnated décor paper, more preferably a melamine formaldehyde impregnated décor paper. The surface layer may also comprise an overlay paper, preferably a resin impregnated overlay paper comprising wear resistant particles.

The surface layer may comprise a layer comprising a thermosetting binder and at least one pigment.

The amount of the thermosetting binder in the balancing layer may be lower than the amount of the thermosetting binder in the surface layer.

The core may be wood-based material such as a MDF, HDF, plywood, OSB, Wood Plastic Composite (WPC), etc.

According to a second aspect of the invention, a semi-finished product for forming a building panel after curing is provided. The semi-finished product comprises a core having a first surface and a second surface opposite the first surface, a balancing layer arranged on the first surface of the core, wherein the balancing layer comprises a sheet impregnated with a thermosetting binder, a surface layer arranged on the second surface of the core, wherein the surface layer comprises a thermosetting binder, wherein a first moisture content of the balancing layer is higher than a second moisture content of the surface layer prior to curing.

By curing is meant curing by applying heat and pressure, i.e. reacting the thermosetting binder to C-stage.

The second aspect incorporates all the advantages of the fifth aspect of the invention, which previously have been discussed in relation to the first aspect, whereby the previous discussion is applicable also for the building panel.

The thermosetting binder of the balancing layer may B-stage.

The balancing layer is adapted to counteract forces formed by the surface layer during pressing and cooling such that the building panel remains essentially flat in room temperature after pressing and curing.

The first moisture content of the balancing layer may be about 6-30%, preferably 8-20%, of the total weight of the balancing layer prior to curing.

The first moisture content of the balancing layer may exceed 10%, preferably exceeds 20%, more preferably exceeds 30%, of the total weight of the balancing layer prior to curing.

The thermosetting binder may be of the same type in the surface layer and in the balancing layer.

The thermosetting binder of the surface layer and/or the balancing layer may be melamine formaldehyde resin. The thermosetting binder of the surface binder and/or the balancing layer may also be urea melamine formaldehyde or a combination of urea/melamine formaldehyde.

The sheet impregnated with the thermosetting binder may be a paper impregnated with the thermosetting binder, preferably a melamine formaldehyde impregnated paper.

The surface layer may comprises a décor paper, preferably a resin impregnated décor paper, more preferably a melamine formaldehyde impregnated décor paper. The surface layer may also comprise an overlay paper, preferably a resin impregnated paper comprising wear resistant particles.

The surface layer may comprise a layer comprising a thermosetting binder and at least one pigment.

According to third aspect of the invention, a method of producing a building panel is provided. The method comprises providing a core, applying a balancing layer on a first surface of the core, wherein the balancing layer has a first moisture content and comprises a B-stage thermosetting binder, applying a surface layer on a second surface of the core, wherein the surface layer has a second moisture content and comprises a B-stage thermosetting binder, adjusting the first moisture content of the balancing layer such that the first moisture content of the balancing layer is higher than the second moisture content of the surface layer prior to curing, and curing the thermosetting binder of the surface layer and the balancing layer to C-stage by applying heat and pressure.

Thermosetting binders may be classified as A-, B-, and C-stage according to their extent of reaction compared to the extent of reaction at gelation. In an A-stage thermosetting binder, the extent of reaction is less than the extent of reaction at gelation, i.e. uncured. A B-stage thermosetting binder is close to the gel point, i.e. semi-cured. A C-stage thermosetting binder is well past the gel point, i.e. cured. The A-stage thermosetting binder is soluble and fusible. The B-stage thermosetting resin is still fusible but is barely soluble. The C-stage thermosetting binder is highly crosslinked and both infusible insoluble. (*Principles of Polymerization*, George Odian, 3$^{rd}$ edition).

The B-stage thermosetting binder applied for the balancing layer may be reacted to the B-stage in a previous step, such as reacted to the B-stage in a dried thermosetting resin impregnated paper, or as a spray-dried thermosetting resin. By a B-stage thermosetting binder is not meant a thermosetting binder in liquid form. In the B-stage, reactivity of the thermosetting binder remains. In the C-stage, the thermosetting binder has no remaining reactivity, or at least almost no reactivity. Thermosetting binders in the B-stage may have a varying degree of crosslinking, from a low degree of crosslinking being close to A-stage, to a high degree of crosslinking being close to C-stage.

The B stage thermosetting binder of the balancing layer may be present in form of, for example, a sheet impregnated with the thermosetting binder such as a paper sheet impregnated with the thermosetting binder, a thermosetting binder applied in powder form.

The balancing layer is adapted to counteract shrinking forces formed by the surface layer during pressing and cooling such that the building panel remains essentially flat in room temperature after pressing. The shrinking forces formed by the thermosetting binder of the surface layer during pressing and curing are balanced or counteracted by the shrinking forced formed by the thermosetting binder of the balancing layer during pressing. By arranging a balancing layer on the core opposite the surface layer, the shrinking forces formed by the thermosetting binder in the surface layer and by the thermosetting binder in the balancing layer are balanced against each other.

An advantage of at least embodiments of the invention is that by adjusting the moisture content of the balancing layer to be higher than the moisture content of the surface layer prior to curing, for example, by applying water on the core and/or on the balancing layer, the balancing layer can balance larger shrinking forces formed by the surface layer during pressing and cooling. By increasing the moisture content of the balancing layer prior to curing, the amount of thermosetting binder of the balancing layer can be reduced. A thinner paper, i.e. a paper having reduced weight per square meter, can also be used. The reduced amount of the thermosetting binder of the balancing layer is compensated by the effects of the higher moisture content of the balancing layer.

Pressing tests show that a suitable moisture content in a balancing layer comprising a thermosetting binder such as melamine formaldehyde may increase the shrinking forces during curing and cooling and that this may be used to reduce the amount of the thermosetting binder in the balancing layer. It is preferred that the moisture content in the thermosetting binder of the balancing layer prior to pressing is higher than the general moisture content of about 6% that is the case when a conventional impregnated paper is used as a balancing layer. The moisture content of the balancing layer should preferably exceed the moisture content of the surface layer. The moisture content of the balancing layer preferably exceeds 10% of the total weight of the balancing layer. In some application it may be an advantage to use even higher moisture contents, for example, exceeding 20%. The moisture content is measured prior to pressing. The moisture content in a conventional backing paper is usually limited by the fact that the papers are stacked on a pallet and too high moisture content causes sticking and single paper sheets cannot be taken from the pallet.

The moisture in the balancing layer contributes to the increased balancing capacity of the balancing layer in several ways. The moisture in the balancing layer facilitates and improves heat transfer from the heated press plates into the balancing layer, thus accelerating and/or increasing crosslinking of the thermosetting resin. The moisture content also influences curing of the thermosetting resin by increasing or facilitating floating of the thermosetting binder, which may result in a higher degree of cross-linking. The moisture content of the balancing layer may also influence the core of the building panel. The moisture content of the balancing layer may make the core, for example, a core of a wood-based material, more formable during pressing. A small convex backward bending of the core may be achieved, counteracting an upward bending of the edges of the surface layer.

The step of adjusting the first moisture content of the balancing layer may comprise applying a water or steam to the first surface of the core prior to applying the balancing layer.

The step of adjusting the first moisture content of the balancing layer may comprise applying a water or steam to the balancing layer.

The first moisture content of the balancing layer may be about 6-30%, preferably 8-20% of the total weight of the balancing layer prior to curing.

The first moisture content of the balancing layer may exceed 10%, preferably exceeds 20%, more preferably exceeds 30%, of the total weight of the balancing layer.

The thermosetting binder may be of the same type in the surface layer and in the balancing layer.

The thermosetting binder of the surface layer and/or the balancing layer may be melamine formaldehyde resin. The thermosetting binder of the surface binder and/or the balancing layer may also be urea melamine formaldehyde or a combination of urea/melamine formaldehyde. Any other amino resin is also possible, such as phenol formaldehyde resin.

The balancing layer may comprise a sheet impregnated with the thermosetting binder, preferably a paper sheet impregnated with thermosetting binder.

The step of applying the balancing layer may comprise applying the thermosetting binder in powder form.

The balancing layer may comprise at least 80 wt % of the thermosetting binder, preferably at least 90 wt % of the thermosetting binder.

The amount of the thermosetting binder in the balancing layer may be lower than the amount of the thermosetting binder in the surface layer.

The surface layer may comprises a décor paper, preferably a resin impregnated décor paper, more preferably a melamine formaldehyde impregnated décor paper. The surface layer may also comprise an overlay paper, preferably a resin impregnated paper comprising wear resistant particles.

The surface layer may comprise a layer comprising a thermosetting binder and at least one pigment.

BRIEF DESCRIPTION OF THE DRAWINGS

The present invention will by way of example be described in more detail with reference to the appended schematic drawings, which show embodiments of the present invention.

FIGS. 4a-e illustrates a method of producing a building panel according to an embodiment.

DETAILED DESCRIPTION

Figure 1:
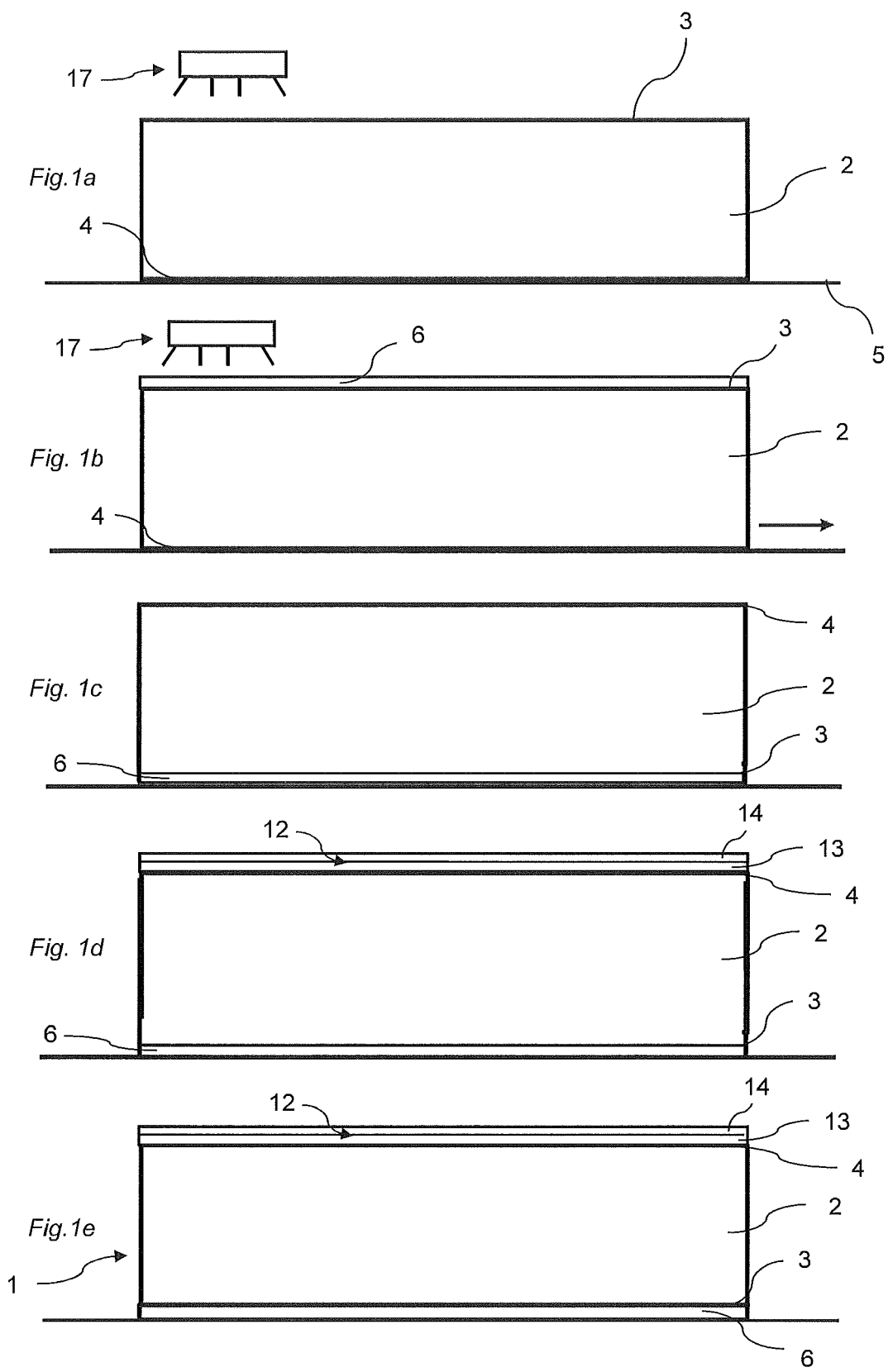
FIGS. 1a-e illustrates a method of producing a building panel according to an embodiment of the present invention.

FIGS. 1a-e illustrates a method of producing a building panel 1 according to an embodiment of the present invention. The building panel 1 may be a floor panel, a wall panel, a ceiling panel, a furniture component, etc.

The method comprises providing a core 2. The core 2 is preferably a wood-based board such as MDF or HDF. The core 2 may also be a particle board, OSB or plywood. The core may also be a Wood Plastic Composite (WPC). The core 2 comprises a first surface 3 and a second surface 4 opposite the first surface 3. The core 2 may be arranged on a conveyor belt 5 conveying the core 2 between the steps described below with reference to FIGS. 1a-e.

Steam or water is applied, preferably by spraying, on the first surface 3 of the core 2 by a steam or water application device 17 as shown in FIG. 1a. 10-45 g/m2, preferably 15-30 g/m2, of water may be applied. The water or steam may be applied as an aqueous solution. The aqueous solution may comprise release and wetting agents and catalysts.

In FIG. 1b, a balancing layer 6 is applied to the first surface 3 of the core 2. In the embodiment shown in FIGS. 1a-e, the balancing layer comprises a sheet impregnated with a thermosetting binder, such as a paper sheet impregnated with a thermosetting binder. As an alternative to a paper sheet, a glass fibre sheet or non-woven may be provided.

The thermosetting binder may be an amino resin such as melamine formaldehyde, phenol formaldehyde, urea formaldehyde, or a combination thereof. The thermosetting binder may be B-stage when applied as the balancing layer 6, i.e. close to the gel point.

Alternatively, or as a complement to applying steam or water on the first surface 3 of the core 2, steam or water may be applied on the balancing layer 6 when arranged on the core 2, as shown in FIG. 1b.

By applying steam or water on the core 2 and/or on the balancing layer 6, moisture is added to the balancing layer 6 and/or a portion of the core 2 adjacent the balancing layer 6 such that the moisture content of the balancing layer is adjusted. Pressing tests show that a suitable moisture content in the balancing layer 6 comprising a thermosetting binder such as melamine formaldehyde may increase the shrinking forces during curing and cooling and that this may be used to reduce the content of the thermosetting binder in the balancing layer 6. It is preferred that the moisture content in the thermosetting binder of the balancing layer 6 prior to pressing is higher than the general moisture content of about 4.5-6% that is the case when conventional impregnated paper is used as a balancing layer. The moisture content of the balancing layer 6 should preferably exceed the moisture content of the surface layer 12. The moisture content of the balancing layer 6 may be 6-30%, preferably 8-20%, of the total weight of the balancing layer 6. In some application it may be an advantage to use even higher moisture contents, for example, exceeding 20%. The moisture content is measured prior to pressing.

In order to further adjust the moisture content of the balancing layer 6 prior to pressing, the balancing layer 6 may be heated by, for example, IR or hot air to dry the balancing layer 6. The thermosetting binder remains essentially in B-stage.

The core 2 with the balancing layer 6 may be handled. For example, the core may be turned such that the balancing layer 6 faces the conveyor belt 5 as shown in FIG. 1c. The core 2 with the balancing layer 6 may be stacked on a pallet for intermediate storage, or may be stored and transported to another plant. Thereby, the core 2 having the balancing layer 6 attached thereto may be produced in a different process than the subsequent application of the surface layer, and at a different location.

A surface layer 12 is applied to the second surface 4 of the core 2 as shown in FIG. 1d. The surface layer 12 may be a décor paper 14 such as a resin impregnated paper. The resin impregnated paper 14 is preferably a melamine or urea formaldehyde impregnated paper. The surface layer 12 may further comprise an overlay paper 14 as shown in FIG. 1d. The surface layer 12 may be a DPL. The décor paper 13 is arranged directly on the second surface 4 of the core 2. The overlay paper 14 is arranged on the décor paper 13. The décor paper 13 is preferably impregnated with a resin, preferably impregnated with melamine formaldehyde resin. The décor paper 13 comprises preferably a decorative print. The overlay paper 14 is preferably also impregnated with a resin, for example, melamine formaldehyde resin. The overlay paper 14 comprises preferably wear resistant particles such as aluminium oxide. The overlay paper 14 is preferably transparent.

Alternatively, the surface layer 12 may be a wood fibre based powder comprising wood fibres, a thermosetting resin and wear resistant particles. It is also contemplated that the surface layer 12 may be of any other type, for example, a veneer layer, or a combination of a décor paper and a wood fibre based surface.

The surface layer 12 may also be a layer of a thermosetting binder such as melamine formaldehyde or urea formaldehyde. The layer may consist essentially of the thermosetting binder but may also comprise decorative elements such as pigments and wear resistant particles such as aluminium oxide. The surface layer 12 comprises in this embodiment no paper.

In a preferred embodiment, the binder of the balancing layer 6 and the binder of the surface layer 12 is of the same type. Preferably, melamine formaldehyde resin is used both in the surface layer 12 and in the balancing layer 6.

A semi-finished product as shown in FIG. 1d is thereby obtained. The semi-finished product comprises the core 2 having the balancing layer 6 and the surface layer 12 arranged thereon. The balancing layer 6 comprises a sheet impregnated with the thermosetting binder. The moisture content of the balancing layer 6 is higher than the moisture content of the surface layer 12 as measured prior to curing by applying heat and pressure.

The moisture content of the balancing layer 6 prior to curing may be about 6-30%, preferably 8-20%, of the total weight of the balancing layer prior to curing. The balancing layer 6 and the surface layer 12 is thereafter cured by applying heat and pressure in a press. The thermosetting binder of the balancing layer 6 and the surface layer 12 is cured to its C stage. By curing and pressing the surface layer 12 and the balancing layer 6 to the core 2, the surface layer 12 and the balancing layer 6 are adhered to the core 2. Thereby, a building panel 1 comprising the core 2, the surface layer 12 and the balancing layer 6 is obtained, which is shown in FIG. 1e.

After pressing, the balancing layer 6 balances the tension created by the surface layer 12 during curing such that the building panel 1 remains essentially flat after pressing and cooling ("pressing balancing" and "cooling balancing"). By essentially flat is meant a cupping less than 2 mm/m. A small convex backward bending being less than 2 mm/m is preferred. The thermosetting binder of the balancing layer 6 balances forces created by the thermosetting binder of the surface layer 12. By applying water on the core 2 and/or on the balancing layer 6, the balancing layer 6 may balance larger shrinking forces formed by the surface layer 12 during pressing and cooling. Thereby, the amount of the thermosetting binder of the balancing layer 6 can be reduced. As an example, the amount of the thermosetting binder in the balancing layer 6 may about 75% of the amount of the thermosetting binder in the surface layer FIGS. 2a-e illustrates a method of producing a building panel 1 according to an embodiment of the present invention. The building panel 1 may be a floor panel, a wall panel, a ceiling panel, a furniture component, etc.

The method comprises providing a core 2. The core 2 is preferably a wood-based board such as MDF or HDF. The core 2 may also be a particle board, OSB or plywood. The core may also be a Wood Plastic Composite (WPC). The core 2 comprises a first surface 3 and a second surface 4 opposite the first surface 3. The core 2 may be arranged on a conveyor belt 5 conveying the core 2 between the steps described below with reference to FIG. 2a-e.

Figure 2:
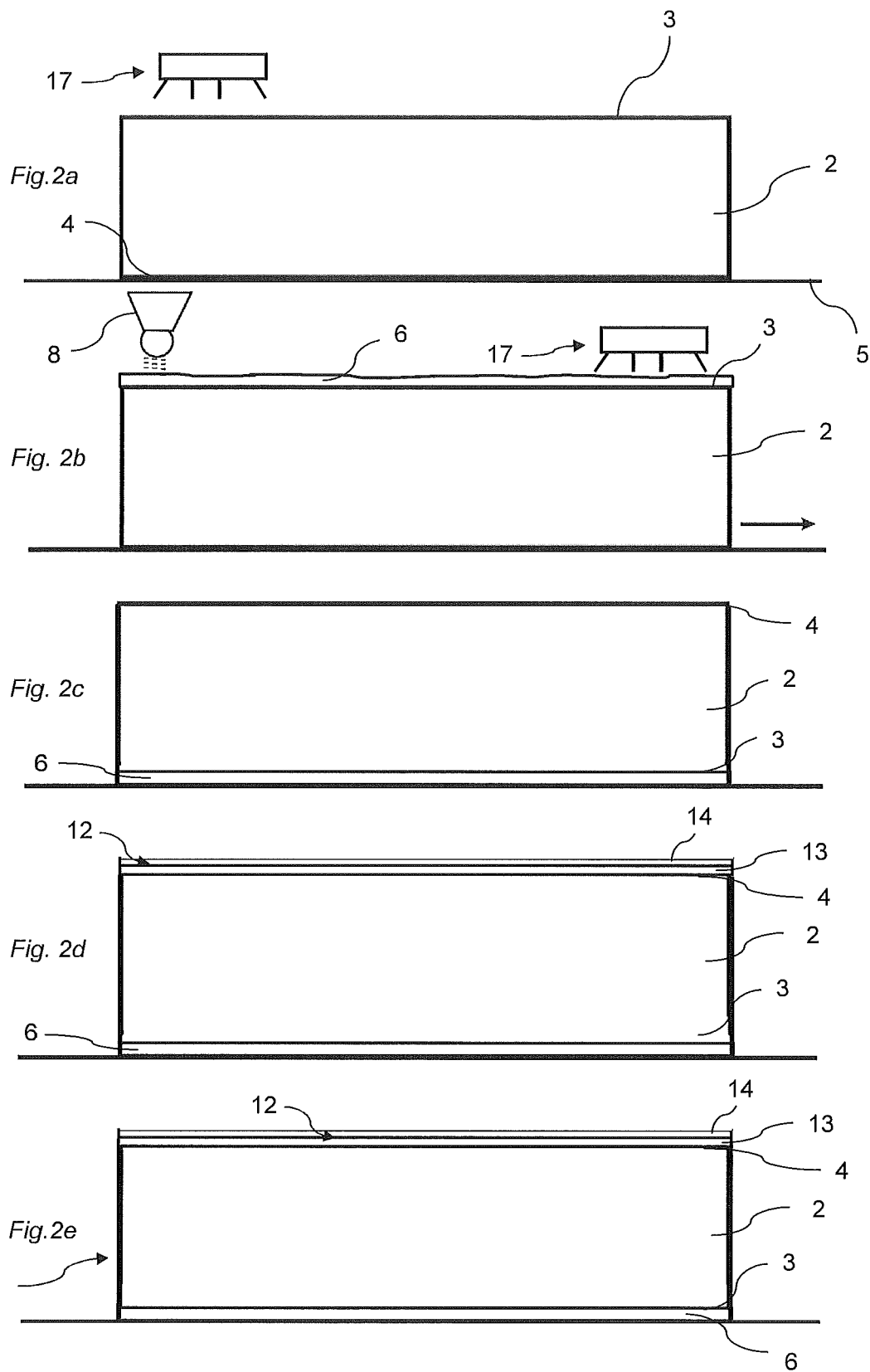
FIGS. 2a-e illustrates a method of producing a building panel according to an embodiment of the present invention.

Steam or water is applied, preferably by spraying, on the first surface 3 of the core 2 by a steam or water application device 17 as shown in FIG. 2a. 10-45 g/m2, preferably 15-30 g/m2, of water may be applied. The water or steam may be applied as an aqueous solution. The aqueous solution may comprise release and wetting agents and catalysts.

In FIG. 2b, a balancing layer 6 is applied to the first surface 3 of the core 2. The balancing layer comprises a B-stage thermosetting binder. The thermosetting binder may be an amino resin such as melamine formaldehyde, phenol formaldehyde, urea formaldehyde, or a combination thereof. The thermosetting binder may have reacted to the B-stage in a previous step, such as in a dried resin impregnated paper, or as in spray-dried thermosetting binder. The balancing layer 6 comprising the B-stage thermosetting binder may be applied as a sheet impregnated with the thermosetting binder, for example, a paper sheet, as described above with reference to FIGS. 1a-e. The B-stage thermosetting binder may also be applied in powder form for forming the balancing layer 6, as shown in FIGS. 2a-e.

In FIG. 2b, a B-stage thermosetting binder is applied in powder form on the first surface 3 of the core 2 for forming a balancing layer 6. The thermosetting binder is preferably melamine formaldehyde resin in dry powder form, such as spray dried melamine formaldehyde resin. Additives such as wetting agents, release agents, catalyst, may be added to the thermosetting binder. The thermosetting powder 7 preferably has an average particle size of in the range of about 50-150 microns.

The thermosetting powder 7 is preferably scattered on the first surface 3 of the core 2 by a scattering unit 8. The thermosetting binder in powder form is applied on the first surface 3 of the core 2 such as a layer forming a balancing layer 6 is formed. The scattered layer comprises preferably 50-150 g/m2, such as 50-100 g/m2, of spray dried thermosetting binder such as spray dried melamine formaldehyde particles. The scattered layer preferably corresponds to a thickness of about 0.1-0.5 mm of powder or about 0.1-0.2 mm of a pressed and cured thermosetting binder layer such as a melamine formaldehyde layer.

Since water or steam has been applied to the first side 3 of the core 2 prior to applying the thermosetting binder, the thermosetting binder gets tacky and sticks together such that a layer of the thermosetting binder is formed and such that the layer of the thermosetting binder adheres to the core. Thereby, it is possible to handle the core without the thermosetting binder falling off the core.

Alternatively, or as a complement to applying steam or water on the first surface 3 of the core 2, steam or water may be applied on the balancing layer 6 when arranged on the core 2, as shown in FIG. 2b.

By applying steam or water on the core 2 and/or on the balancing layer 6, moisture is added to the balancing layer 6 and/or a portion of the core 2 adjacent the balancing layer 6 such that the moisture content of the balancing layer is adjusted. Pressing tests show that a suitable moisture content in the balancing layer 6 comprising a thermosetting binder such as melamine formaldehyde may increase the shrinking forces during curing and cooling and that this may be used to reduce the content of the thermosetting binder in the balancing layer 6. It is preferred that the moisture content in the thermosetting binder of the balancing layer 6 prior to pressing is higher than the general moisture content of about 4.5-6% that is the case when conventional impregnated paper is used as a balancing layer. The moisture content of the balancing layer 6 should preferably exceed the moisture content of the surface layer 12. The moisture content of the balancing layer 6 may be 6-30%, more preferably 8-20%, of the total weight of the balancing layer 6. In some application it may be an advantage to use even higher moisture contents, for example, exceeding 20%. The moisture content is measured prior to pressing.

In order to further adjust the moisture content of the balancing layer 6 prior to pressing, the balancing layer 6 may be heated by, for example, IR or hot air to dry the balancing layer 6. The balancing layer 6 remains essentially in B-stage, or at least not completely in C-stage.

The core 2 with the balancing layer 6 may be handled, for example, turned such that the balancing layer 6 faces the conveyor belt 5 as shown in FIG. 2c. The core 2 with the balancing layer 6 may be stacked on a pallet for intermediate storage, or may be stored and transported to another plant. Thereby, the core 2 having the balancing layer 6 attached thereto may be produced in a different process than the subsequent application of the surface layer, and at a different location.

When the semi-finished product has been turned, a surface layer 12 is applied to the second surface 4 of the core 2 as shown in FIG. 2d. The surface layer 12 may be a décor paper 14 such as a resin impregnated paper. The resin impregnated paper 14 is preferably a melamine or urea formaldehyde impregnated paper. In the embodiment shown in FIG. 2d, the surface layer 12 further comprises an overlay paper 14. The surface layer 12 may be a DPL. The décor paper 13 is arranged directly on the second surface 4 of the core 2. The overlay paper 14 is arranged on the décor paper 13. The décor paper 13 is preferably impregnated with a resin, preferably impregnated with melamine formaldehyde resin. The décor paper 13 comprises preferably a decorative print. The overlay paper 14 is preferably also impregnated with a resin, for example, melamine formaldehyde resin. The overlay paper 14 comprises preferably wear resistant particles such as aluminium oxide. The overlay paper 14 is preferably transparent.

Alternatively, the surface layer 12 may be a wood fibre based powder comprising wood fibres, a thermosetting resin and wear resistant particles. It is also contemplated that the surface layer 12 may be of any other type, for example, a veneer layer, or a combination of a décor paper and a wood fibre based surface.

The surface layer 12 may also be a layer of a thermosetting binder such as melamine formaldehyde or urea formaldehyde. The layer may consist essentially of the thermosetting binder. A layer consisting essentially of the thermosetting binder may also include decorative elements, such as pigments, and wear resistant particles, such as aluminium oxide. The surface layer 12 comprises, in this embodiment, no paper.

In a preferred embodiment, the binder of the balancing layer 6 and the binder of the surface layer 12 is of the same type. Preferably, melamine formaldehyde resin is used both in the surface layer 12 and in the balancing layer 6.

A semi-finished product as shown in FIG. 2d is thereby obtained. The semi-finished product comprises the core 2 having the balancing layer 6 and the surface layer 12 arranged thereon. The balancing layer 6 comprises a sheet impregnated with the thermosetting binder. The moisture content of the balancing layer 6 is higher than the moisture content of the surface layer 12 as measured prior to curing by applying heat and pressure.

The moisture content of the balancing layer 6 prior to curing preferably may be 6-30%, more preferably 8-20%, of the total weight of the balancing layer 6.

The balancing layer 6 and the surface layer 12 is thereafter cured by applying heat and pressure in a press. The thermosetting binder of the balancing layer 6 and the surface layer 12 is cured to its C stage. By curing and pressing the surface layer 12 and the balancing layer 6 to the core 2, the surface layer 12 and the balancing layer 6 are adhered to the core 2. Thereby, a building panel 1 comprising the core 2, the surface layer 12 and the balancing layer 6 is obtained, which is shown in FIG. 2e.

After pressing, the balancing layer 6 balances the tension created by the surface layer 12 during curing such that the building panel 1 remains essentially flat after pressing and cooling ("pressing balancing" and "cooling balancing"). By essentially flat is meant a cupping less than 2 mm/m. A small convex backward bending being less than 2 mm/m is preferred. The thermosetting binder of the balancing layer 6 balances forces created by the thermosetting binder of the surface layer 12. By applying water on the core 2 and/or on the balancing layer 6, the balancing layer 6 may balance larger shrinking forces formed by the surface layer 12 during pressing and cooling. Thereby, the amount of the thermosetting binder of the balancing layer 6 can be reduced.

The balancing layer 6 described above with reference to FIGS. 2a-e comprises at least 80% by weight of the thermosetting binder, preferably at least 90% by weight of the thermosetting binder. In addition to the thermosetting binder, the balancing layer 6 may comprise various additives. The balancing layer 6 is in this embodiment paper free, i.e. comprises no paper. In a preferred embodiment, the balancing layer 6 comprises only the thermosetting binder and optional additives. The balancing layer may consist of, or essentially consist of, the thermosetting binder. It is also contemplated that filler particles may be applied to the balancing layer 6, preferably in an amount less than 20% by weight of the balancing layer 6, more preferably in an amount less than 10% by weight of the balancing layer 6. Filler particles may include wood fibres, aluminium oxide sand or other minerals, etc. The filler particles may be scattered onto the layer of the thermosetting binder. The filler particles may be used to reinforce the balancing layer 6 or to facilitate scattering. The filler particles may also be used to increase the tension forces that may be formed by the balancing layer 6.

It is also contemplated that the water or steam may be applied to the balancing layer 6 just before pressing. The semi-finished product comprising the core 2 and the balancing layer 6 as described above with reference to FIGS. 1a-e and 2a-e may be stored and transported. Prior to pressing, water or steam is applied to the balancing layer 6 such that the moisture content of the balancing layer 6 is higher than the moisture content of the surface layer being applied to the second side 4 of the core 2. The surface layer 12 and the balancing layer 6 is thereafter cured and attached to the core 2 by applying heat and pressure. A building panel 1 is thereby formed, as shown in FIGS. 1e and 2e.

Figure 3:
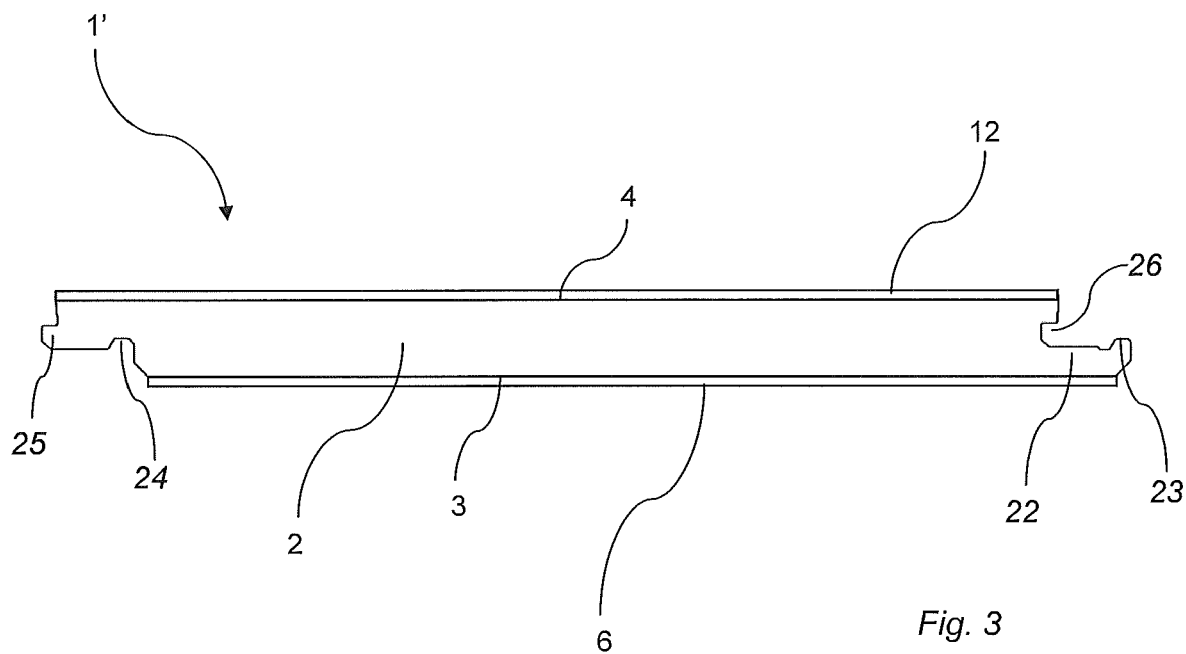
FIG. 3 illustrates a floor panel provided with a mechanical locking system.

The building panel 1 as described above may be a floor panel, a wall panel, a ceiling panel, a furniture component, etc. In the embodiment wherein the building panel is a floor panel, the floor panel 1' may be provided with a mechanical locking system as shown in FIG. 3. The floor panel 1' shown in FIG. 3 is provided with a mechanical locking system for locking the floor panel 1' to adjacent floor panels horizontally and/or vertically. The mechanical locking system comprises at a first edge of the floor panel 1' a tongue groove 26 adapted to receive a tongue 25 of an adjacent floor panel, and a locking strip 22 provided with a locking element 23 adapted to cooperate with a locking groove 24 of an adjacent floor panel and lock the floor panel 1' in a horizontal direction to the adjacent floor panel. The mechanical locking system further comprises at a second edge a locking groove 24 adapted to receive a locking element 23 of an adjacent floor panel, and a tongue 25 adapted cooperate with a tongue groove 26 of an adjacent floor panel and lock the panel 1' in a vertical direction. The mechanical locking system is formed in the core 2 of the floor panel 1'. Both long side edges and short side edges of the floor panel 1' may be provided with a mechanical locking system. Alternatively, long side edges of the floor panel 1' may be provided with the mechanical locking system for horizontally and vertically locking, and the short side edges may be provided with a mechanical locking system for horizontally. The mechanical locking system may be of the type disclosed in WO 2007/015669. The binder of the balancing layer will during pressing penetrate into the core material and reinforce the outer parts of the first surface 3 of the core 2 where the locking strip 22 is formed. The high binder content of the balancing layer 6 will increase the locking strengths of the mechanical locking system.

Another embodiment of a method of producing a building panel 1 will now be described with reference to FIGS. 4a-e. The method comprises providing a core 2. The core 2 is preferably a wood-based board such as MDF or HDF. The core 2 may also be an OSB or plywood. The core 2 comprises a first surface 3 and a second surface 4 opposite the first surface 3. The core 2 may be arranged on a conveyor belt 5 conveying the core 2 between the steps described below with reference to FIG. 4a-e.

FIG. 4a illustrates that a thermosetting binder is applied on the first surface 3 of the core 3 for forming a balancing layer 6. The thermosetting binder is applied as a liquid. The thermosetting binder is dissolved in a solvent, preferably a water based solvent, thus forming a liquid. The thermosetting binder is preferably melamine formaldehyde resin. Additives such as wetting and release agents, catalyst may be added to the solvent.

A layer of the liquid thermosetting binder 7' is applied to the first surface 3 of the core 2 for forming the balancing layer 6. Thereafter, the layer of the thermosetting binder is preferably dried as shown in FIG. 4b. A heating apparatus 16, preferably an IR heating apparatus or hot air, is provided for drying the layer of the thermosetting binder.

Preferably, several layers of the thermosetting binder are applied to the first surface 3 of the core 2 for forming the balancing layer 6. Preferably, a drying step is provided between application of each layer.

The layer or layers of the thermosetting binder is adapted to form a balancing layer 6 of the building panel 1.

Drying of the layer or layers of the thermosetting binder is performed at a temperature wherein the thermosetting binder remains essentially in B-stage. The object of the heating step is to obtain a layer which is touch dry such that the core with the thermosetting layer can be handled.

The core 2 having the thermosetting binder arranged thereon for forming the balancing layer 6 forms a semi-finished product, which is shown in FIG. 4c. The semi-finished product comprises the core 2 and the layer of the thermosetting binder for forming the balancing layer 6. In the semi-finished product, the thermosetting binder remains essentially in B-stage.

The semi-finished product may be handled as a separate product due to the balancing layer being dried and adhered to the core 2. For example, the semi-finished may be stacked on a pallet for intermediate storage, or may be stored and transported to another plant. Thereby, the core 2 having the layer of thermosetting binder for forming the balancing layer 6 attached thereto may be produced in a different process than the subsequent application of the surface layer 12, and at a different location.

The semi-finished product may also be turned 180° such that the balancing layer 6 of the thermosetting binder is directed downwards, for example, towards the conveyor belt 5 as shown in FIG. 4c.

When the semi-finished product has been turned, a surface layer 12 may be applied on the second surface 4 of the core 2 as shown in FIG. 4d. In the shown embodiment, the surface layer 12 comprises a décor paper 13 and an overlay paper 14. The surface layer 12 may be a DPL. The décor paper 13 is arranged directly on the second surface 4 of the core 2. The overlay paper 14 is arranged on the décor paper 13. The décor paper 13 is preferably impregnated with a resin, preferably impregnated with melamine formaldehyde resin. The décor paper 13 comprises preferably a decorative print. The overlay paper 14 is preferably also impregnated with a resin, for example, melamine formaldehyde resin. The overlay paper 13 comprises preferably wear resistant particles such as aluminium oxide. The overlay paper 13 is preferably transparent.

In a preferred embodiment, the binder of the balancing layer 6 and the binder of the surface layer 12 is of the same type. Preferably, melamine formaldehyde resin is used both in the surface layer 12 and in the balancing layer 6.

Alternatively, the surface layer 12 may be a wood fibre based powder comprising wood fibres, a thermosetting binder, preferably melamine formaldehyde resin, and wear resistant particles, such as aluminium oxide. It is also contemplated that the surface layer may be of any other type, for example, a veneer layer, or a combination of a décor paper and a wood fibre based surface or a combination of a veneer layer and a wood fiber based surface.

The thermosetting binder of the layer for forming the balancing layer 6 and of the surface layer 12 is thereafter cured by applying heat and pressure in a press. Thereby, the balancing layer 6 is formed. By curing and pressing the surface layer 12 and the balancing layer 6 to the core 2, the surface layer 12 and the balancing layer 6 are adhered to the core 2. Thereby, a building panel 1 having the core 2, the surface layer 12 and the balancing layer 6 is formed, which is shown in FIG. 5e.

After pressing, the balancing layer 6 balances the tension created by the surface layer 12 such that the building panel 1 remains essentially flat after pressing and cooling ("pressing balancing" and "cooling balancing"). By essentially flat is meant a cupping less than 2 mm/m. A small convex backward bending being less than 2 mm/m is preferred. The thermosetting binder of the balancing layer 6 balances forces created by the thermosetting binder of the surface layer 12.

By using the same type of binder in the balancing layer 6 as in the surface layer 12, the forces created by the binder in the surface layer 12 are matched and counteracted by the forces created by the binder in the balancing layer 6 on the opposite surface of the core.

In addition to the thermosetting binder, the balancing layer 6 may comprise various additives. The balancing layer 6 is in this embodiment paper free, i.e. comprises no paper. In a preferred embodiment, the balancing layer 6 comprises only the thermosetting binder and optional additives. The balancing layer may consist of, or essentially consist of, the thermosetting binder. It is also contemplated that filler particles may be applied to the balancing layer 6, preferably in an amount lower than 50% by weight of the balancing layer 6, more preferably in an amount lower than 20% by weight of the balancing layer 6. Filler particles may include wood fibres, sand, mineral particles, aluminium oxide, etc. The filler particles may be scattered onto the layer of the thermosetting binder such that the balancing layer comprises the thermosetting binder and filler particles. Alternatively, the filler particles may be mixed with the thermosetting binder in liquid form. If a large amount of thermosetting binder is required to balance the surface layer 12, filler particles may be included in the balancing layer 6 to obtain necessary tension of the balancing layer 6.

The methods result in a building panel 1 comprising a core 2, a surface layer 12 and a balancing layer 6 as shown in FIG. 1e, FIG. 2e and FIG. 4e. The core 2 is preferably a wood based board, preferably a wood-based board such as MDF or HDF. The core 2 may also be an OSB or plywood. The balancing layer 6 is arranged on the first surface 3 of the core 2. The surface layer 12 is arranged on the second surface 4 of the core 2, opposite the first surface 3 of the core 2. The surface layer 12 comprises preferably a décor paper 13. The décor paper 13 may be arranged directly on the second surface 4 of the core 2. The décor paper 13 is preferably impregnated with resin, such as impregnated with melamine formaldehyde resin. An overlay paper 14, preferably impregnated with a resin such as melamine formaldehyde resin and comprising wear resistant particles, may be arranged on the décor paper 14. In the embodiment described with reference to FIGS. 2e and 4e, the balancing layer 6 may comprise at least 80 wt % of a thermosetting binder, preferably at least 90 wt % of a thermosetting binder. The thermosetting binder of the balancing layer 6 is preferably the same as the thermosetting binder of the surface layer 12, for example, melamine formaldehyde resin.

In alternative embodiments, the surface layer 12 may be a wood fibre based powder comprising wood fibres, a thermosetting resin and wear resistant particles. The surface layer 12 may also be a layer of a thermosetting binder such as melamine formaldehyde or urea formaldehyde. The surface layer 12 may consist essentially of the thermosetting binder but may also comprise decorative elements such as pigments and wear resistant particles such as aluminium oxide. The surface layer 12 comprises in this embodiment no paper. It is contemplated that there are numerous modifications of the embodiments described herein, which are still within the scope of the invention as defined by the appended claims.

The balancing layer is referred to as a layer. However, during pressing, the thermosetting binder may in some embodiments at least partly impregnate the core such that the layer becomes less distinct. Thereby, the balancing layer may be at least partly integrated into the core. After pressing, the balancing layer may at least partly form part of the core.

It is also contemplated that pre-pressing of the balancing layer may be performed prior to curing the balancing layer and the surface layer. During pre-pressing step, the balancing layer remains in B-stage, or is at least not completely in C-stage. Cooling of the balancing layer may be performed after the pre-pressing step.

Furthermore, it is also contemplated that an overlay paper such as a resin impregnated overlay paper may be included in the surface layer and that the balancing layer balances both the décor layer and the overlay paper.

Embodiments may also be defined as:

A method of producing a building comprises providing a core, applying a thermosetting binder on a first surface of the core for forming a balancing layer, wherein the balancing layer comprises at least 80% by weight of a thermosetting binder, preferably at least 90% by weight of a thermosetting binder, applying a surface layer on a second surface of the core, wherein the surface layer comprises a thermosetting binder, and curing the surface layer and the balancing layer by applying heat and pressure.

The balancing layer is adapted to counteract shrinking forces formed by the surface layer during pressing and cooling such that the building panel remains essentially flat in room temperature after pressing and cooling.

The amount of the thermosetting binder applied on the first surface is chosen such that the balancing layer balances shrinking forces formed by the surface layer during pressing and cooling.

Also the chemical composition of the balancing layer, including, for example, additives applied to the thermosetting binder, affects properties such as tension of the balancing layer.

An advantage of the method is that the balancing layer that consists essentially of a thermosetting resin, counteracts and balances the tension created by the surface layer during pressing ("pressing balancing"). The balancing layer keeps the building panel essentially flat after pressing. Thereafter, the balancing layer counteracts and balances temperature shrinking of the surface layer when the panel is cooled from the present temperature to room temperature ("cooling balancing") such that the building panel remains essentially flat. Finally, the balancing layer counteracts and balances cupping of the edges of the floor panel due to shrinkage and expansion caused by changes in temperature and humidity of the indoor climate ("climate balancing").

By applying essentially only a thermosetting binder as a balancing layer, the cost for the balancing layer is reduced, for example, compared to using an impregnated paper as a balancing layer. Furthermore, the overall production of the building panel is simplified by removing the step of impregnating a paper for forming a balancing paper layer. The production process is simplified by applying the thermosetting binder directly on the core for forming a balancing layer.

The tension of the balancing layer counteracting shrinking forces formed by the surface layer during pressing and cooling may be varied by the amount of thermosetting resin applied, additives applied, for example, additives changing the reactivity of the thermosetting binder, water applied, and the type of thermosetting binder. For example, a lower amount of thermosetting binder may be compensated by adding an additive, applying water, or choosing a thermosetting binder creating larger tension forces such as melamine formaldehyde resin.

The balancing layer is referred to as a layer. However, during pressing, the thermosetting binder may at least partly impregnate the core such that the layer becomes less distinct.

Thereby, the balancing layer may be at least partly integrated into the core. After pressing, the balancing layer may at least partly form part of the core.

The balancing layer may consist essentially of a thermosetting binder. Additives such as, for example, wetting agents, release agents, catalysts, etc., may be included in the balancing layer that consists essentially of the thermosetting binder. Catalyst may influence how large tension forces that may be formed by the balancing layer adapted to counteract shrinking forces of the surface layer.

The pressing temperature may exceed 140° C., for example, 140-210° C.

The amount of the thermosetting binder in the balancing layer may exceed 50 g/m2. The amount of the thermosetting binder in the balancing layer 6 may about 75% of the amount of the thermosetting binder in the surface layer.

The thermosetting binder is preferably an amino resin such as urea formaldehyde or melamine formaldehyde.

The thermosetting binder may include pigments. The thermosetting binder may include wear resistant particles such as aluminium oxide.

In one embodiment, the balancing layer consists of, or consists essentially of the thermosetting binder. In this embodiment, the balancing layer comprises no paper and no wood fibres. However, a balancing layer consisting essentially of the thermosetting binder may include additives.

The thermosetting binder may be of the same type in the surface layer and in the balancing layer. By the expression same type is meant binder belong to the same group of resin, such as melamine formaldehyde, urea formaldehyde, etc. By using the same type of binder in both the surface layer and the balancing layer, the balancing layer matches the behavior of the surface layer The balancing layer balances shrinkage and/or expansion of the balancing layer by counteracting the movements of the surface layer in a similar way when using the same type of thermosetting binder.

The thermosetting binder of the surface layer may be melamine formaldehyde resin. Direct Pressure Laminate (DPL) and High Pressure Laminate (HPL) are conventionally impregnated with melamine formaldehyde resin.

The thermosetting binder of the surface layer and/or the balancing layer may also be urea melamine formaldehyde or a combination of urea/melamine formaldehyde.

The thermosetting binder of the balancing layer may be melamine formaldehyde resin. A balancing layer comprising melamine formaldehyde resin creates greater tension compared to, for example, urea formaldehyde. Therefore, a balancing layer comprising melamine formaldehyde can counteract/balance greater tension formed by the surface layer.

The surface layer may be arranged directly on the core. The balancing layer can balance a surface layer arranged directly on the core.

The surface layer may comprise a décor paper, preferably a resin impregnated décor paper, more preferably a melamine formaldehyde impregnated décor paper. The décor paper may be arranged directly on the core. It has been shown that the balancing layer consisting essentially of a thermosetting binder can be used to balance a surface layer of décor paper. Thus, a balancing layer consisting essentially of a thermosetting binder can be used to balance a DPL.

The surface layer may comprise a layer of a thermosetting binder, preferably melamine formaldehyde resin, and at least one pigment. The surface may in this embodiment consist essentially of the thermosetting binder with optional additives, such as pigments, wear resistant particles, etc.

The amount of the thermosetting binder in the balancing layer may essentially correspond to the amount of the thermosetting binder in the surface layer. Thereby, balancing of the surface layer is further improved.

The amount of the thermosetting binder in the balancing layer may be lower than the amount of the thermosetting binder in the surface layer. The amount of the thermosetting binder in the balancing layer may, for example, be about 80% of the amount of the thermosetting binder in the surface layer.

Thermosetting binder of the balancing layer may be applied in liquid form. Thereby, the balancing layer may be applied as a coating to the core. The balancing layer may be applied as one or several layers of the thermosetting binder. By using a liquid thermosetting binder, no extra off-line drying of the binder is necessary, for example, spray drying or drying of an impregnated paper.

The method may further comprise drying the thermosetting binder. Preferably, the balancing layer remains essentially in B-stage. The balancing layer may be applied as several layers of a thermosetting binder, wherein each layer preferably is dried before application of a subsequent layer.

The step of applying the thermosetting binder forming the balancing layer may comprise applying, preferably by scattering, the thermosetting binder in powder form. The thermosetting binder may be a dry powder. By applying the thermosetting binder in powder form, the balancing layer may be applied in a single step, preferably as a single layer. The thermosetting binder may be spray dried.

The method may further comprise applying water or steam, on the first surface of the core prior to applying to the thermosetting binder. Alternatively, the method may further comprise applying preferably water, or steam, on the thermosetting binder. The aqueous solution or steam is used to stabilize the balancing layer such that the core with the balancing layer can be handled in the production line, for example, be turned around. The aqueous solution or steam makes the thermosetting binder tacky and thereby the thermosetting binder in powder form sticks together. The aqueous solution may comprise release and wetting agents and catalysts. The aqueous solution may include pigments. The thermosetting binder remains essentially in B-stage.

The moisture content of the balancing layer may be higher than the moisture content of the surface layer as measured prior to pressing. The moisture content may be 3-30%, such as 8-20%, of the total weight of the balancing layer. The moisture content of the balancing layer may exceed 10%, preferably 20%, more preferably 30%, of the total weight of the balancing layer. Water or steam may be applied to the thermosetting binder or to the first surface of the core prior to applying the thermosetting binder in order to adjust the moisture content of the balancing layer to be formed.

Pressing test show that a suitable moisture content in a balancing layer comprising a thermosetting binder such as melamine formaldehyde may increase the shrinking forces during curing and cooling and that this may be used to reduce the content of the thermosetting binder in the balancing layer. It is preferred that the moisture content in the thermosetting binder of the balancing layer prior to pressing is higher than the general moisture content of about 6% that is the case when conventional impregnated paper is used as a balancing layer. The moisture content in liquid or spray dried thermosetting binder such as melamine should preferably exceed the moisture content of the surface layer. The moisture content should preferably exceed 10% of the total weight of the balancing layer. In some application it may be an advantage to use even higher moisture contents, for example, exceeding 20%.

According to another embodiment, a building panel is provided. The building panel comprises a core having a first and second surface, a balancing layer arranged on the first surface of the core, wherein the balancing layer comprises at least 80% by weight of a thermosetting binder, preferably at least 90% by weight of a thermosetting binder, a surface layer arranged on the second surface of the core, wherein the surface layer comprises a thermosetting binder.

The balancing layer is adapted to counteract shrinking forces formed by the surface layer during pressing and cooling such that the building panel remains essentially flat in room temperature after pressing.

The balancing layer is referred to as a layer. However, during pressing, the thermosetting binder may at least partly impregnate the core such that the layer becomes less distinct. Thereby, the balancing layer may be at least partly integrated into the core. After pressing, the balancing layer may at least partly form part of the core.

The thermosetting binder may be of the same type in the surface layer and in the balancing layer.

The thermosetting binder of the surface layer may be melamine formaldehyde resin.

The thermosetting binder of the balancing layer may be melamine formaldehyde resin.

The surface layer may be arranged directly on the core.

The surface layer may comprise a décor paper, preferably a resin impregnated décor paper, more preferably a melamine formaldehyde impregnated décor paper.

The amount of the thermosetting binder in the balancing layer may essentially correspond to the amount of the thermosetting binder in the surface layer.

The amount of the thermosetting binder in the balancing layer may be lower than to the amount of the thermosetting binder in the surface layer. The amount of the thermosetting binder in the balancing layer may, for example, be about 80% of the amount of the thermosetting binder in the surface layer.

The moisture content of the balancing layer may be higher than the moisture content of the surface layer as measured prior to pressing. The moisture content may be 6-30%, such as 8-20%, of the total weight of the balancing layer prior to curing.

The moisture content of the balancing layer may exceed 10%, preferably 20%, more preferably 30%, of the total weight of the balancing layer prior to curing.

The surface layer may comprise a layer of a thermosetting binder and at least one pigment. The surface layer may in one embodiment consist of, or consist essentially of a thermosetting binder and optional additives.

According to another embodiment, a semi-finished product is provided. The semi-finished product comprises a core having a first surface, and a balancing layer arranged on the first surface of the core, the balancing layer comprising at least 80% by weight of a thermosetting binder, preferably at least 90% of a thermosetting binder.

The semi-finished product is already provided with a balancing layer. A surface layer can in a separate process be applied to the semi-finished product to form a building panel. The semi-finished product may, for example, be stored and transported.

The thermosetting binder may be essentially B-stage. For example, the balancing layer may only be dried without curing, or if the thermosetting binder is in powder form, liquid or steam may be applied in order to get the binder tacky and stick the powder together and attach to the core.

The thermosetting binder may be melamine formaldehyde resin.

According to another embodiment, a method of producing a building panel is provided. The method comprises: providing a core, applying a thermosetting binder in a liquid form on a first surface of the core for forming a balancing layer, applying a surface layer on a second surface of the core, wherein the surface layer comprises a thermosetting binder, and curing the surface layer and the balancing layer by applying heat and pressure.

The balancing layer is adapted to counteract shrinking forces formed by the surface layer during pressing and cooling such that the building panel remains essentially flat in room temperature after pressing.

Furthermore, by applying the thermosetting binder as a liquid, no extra off-line drying of the binder is necessary, for example, spray drying or drying of an impregnated paper.

The balancing layer is referred to as a layer. However, during pressing, the thermosetting binder may at least partly impregnate the core such that the layer becomes less distinct. Thereby, the balancing layer may be at least partly integrated into the core. After pressing, the balancing layer may at least partly form part of the core.

The balancing layer may be paper free.

The method may further comprise drying the thermosetting binder prior to applying heat and pressure.

The method may further comprise applying filler particles on the thermosetting binder. The filler particles may be wood fibres, sand, mineral particles, aluminium oxide, etc. Alternatively, the filler particles may be mixed with the thermosetting binder.

The balancing layer may comprise at least 80% by weight of the thermosetting binder, preferably at least 90% by weight of the thermosetting binder.

The building panel may be pressed at a temperature of at least 120° C.

The thermosetting binder may be present with the balancing layer with an amount of at least 50 g/m2.

The thermosetting binder may be of the same type in the surface layer and in the balancing layer.

The thermosetting binder of the surface layer and/or the balancing layer is melamine formaldehyde resin. The thermosetting binder of the surface binder and/or the balancing layer may also be urea melamine formaldehyde or a combination of urea/melamine formaldehyde.

The surface layer may be arranged directly on the core.

The surface layer may comprise a décor paper, preferably a resin impregnated décor paper, more preferably a melamine formaldehyde impregnated décor paper.

The surface layer may comprise a layer of a thermosetting binder and at least one pigment.

The amount of the thermosetting binder in the balancing layer may essentially correspond to the amount of the thermosetting binder in the surface layer.

The amount of the thermosetting binder in the balancing layer may be lower than the amount of the thermosetting binder in the surface layer.

The moisture content of the balancing layer may be higher than the moisture content of the surface layer.

The moisture content may be 6-30%, such as 8-20%, of the total weight of the balancing layer prior to curing.

The moisture content of the balancing layer may exceed 10%, preferably 20%, more preferably 30%, of the total weight of the balancing layer prior to curing.

EXAMPLES

Example 1: Dry Melamine Formaldehyde Resin

A water solution was sprayed on one surface of a standard HDF board, Sonae 9.7 mm. Then 100 g/m2 melamine formaldehyde powder resin—773 from BASF—was applied with a scattering device on the wet HDF board.

The HDF board was then turned upside down and a surface layer containing 100 g/m2 melamine formaldehyde resin was applied on the other side of the board.

The HDF board containing a clean dry melamine formaldehyde resin on one side for forming a balancing layer and on the other side a surface layer containing 100 g/m2 melamine, then was put into a press where heat and pressure was applied.

Pressing conditions:
Temperature: 160° C. on the upper and under heating plates.
Pressing time: 20 sec
Pressure: 40 bar During the pressing operation the melamine formaldehyde resins cured and a laminate board was obtained.

In order to investigate the cupping behavior of this product we placed the above flooring laminate into different climates. After 3 days in 50% RH climate the cupping was +0.83 mm (convex cupping). After 2 days in 25% RH climate the cupping was −0.07 mm (slightly concave).

Example 2: Wet Melamine Formaldehyde Resin 300 g/m2 wet melamine formaldehyde resin with a solid content of 50% was applied with a roller device one surface of a standard HDF board, Sonae 9.7 mm, and then dried in an oven so the surface was dry which gives the possibility to turn the HDF board upside down. A surface layer containing 300 g/m2 melamine formaldehyde resin was applied on the other side of the board.

The HDF board containing a wet melamine resin on one side for forming a balancing layer and on the other side a surface layer containing 300 g/m2 melamine resin was then put into a press where heat and pressure was applied.

Pressing conditions:
Temperature: 170° C. on the upper and under heating plates.
Pressing time: 30 sec
Pressure: 40 bar During the pressing operation the melamine formaldehyde resins cured and a laminate board was obtained.

In order to investigate the cupping behavior of this product we placed the above flooring laminate into different climates. After 3 days in 50% RH climate the cupping was −0.7 mm (concave cupping). After 16 days in 25% RH climate the cupping was −0.47 mm (concave cupping).

Example 3: Water

In order to investigate the influence of water, water was added to a top surface layer. A top surface layer containing 100 g/m2 melamine formaldehyde resin was applied on a surface of a standard HDF board, Sonae 9.7 mm. On top of this a layer 15 g/m2 of water was applied with a spraying device. On the opposite surface of the board a surface layer containing 100 g/m2 melamine was applied.

The board was then put into a press where heat and pressure was applied.

Pressing conditions:
Temperature: 170° C. on the upper and under heating plates.
Pressing time: 30 sec
Pressure: 40 bar During the pressing operation the melamine formaldehyde resins cured and a laminate board was obtained.

In order to investigate the cupping behavior of this product we placed the above board into different climates. After 3 days in 50% RH climate the cupping was −1.33 mm (concave cupping). After 3 days in 25% RH Climate the cupping was −2.11 mm (concave cupping).

The above trial was repeated with higher water amounts added on a top surface of a HDF board, in increased steps:

30 g/m2 of water applied was applied on the HDF board giving the following cupping:

After 3 days in 50% RH climate the cupping was −1.64 mm (concave cupping). After 3 days in 25% RH Climate the cupping was −2.51 mm (concave cupping).

45 g/m2 of water applied giving the following cupping:

After 3 days in 50% RH climate the cupping was −3.17 mm (concave cupping). After 3 days in 25% RH Climate the cupping was −4.30 mm (concave cupping).

60 g/m2 giving the following cupping:

After 3 days in 50% RH climate the cupping was −3.24 mm (concave cupping). After 3 days in 25% RH Climate the cupping was −4.55 mm (concave cupping).

As can be seen in the above examples, the more water added, the more concave cupping is created on the side where water is added, i.e. in this example on the top surface.

Example 4: Water

Five different examples were tested. The examples had the following build-up:

|  | A (Reference) | B | C | D | E |
|---|---|---|---|---|---|
| Overlay | MF impregnated overlay paper | MF impregnated overlay paper | MF impregnated overlay paper | MF impregnated overlay paper | MF impregnated overlay paper |
| Décor layer | MF impregnated décor paper | MF impregnated décor paper | MF impregnated décor paper | MF impregnated décor paper | MF impregnated décor paper |
| Core | HDF | HDF | HDF | HDF | HDF |
| Water applied on core (g/m2) | 0 | 15 | 0 | 15 | 15 |
| Water applied on balancing | 0 | 0 | 15 | 15 | 15 |

-continued

|  | A (Reference) | B | C | D | E |
|---|---|---|---|---|---|
| layer (g/m2) | | | | | |
| Balancing layer | MF impregnated backing paper | MF impregnated backing paper | MF impregnated backing paper | MF impregnated backing paper | MF impregnated overlay paper |

MF = melamine formaldehyde resin.

The water applied also contained about 1 wt % of a catalyst, about 3-6 wt % of a release agent, and about 2.5 wt % of a wetting agent.

The different layers had the following composition:

|  | Layer | | |
|---|---|---|---|
|  | Overlay | Décor | Backing |
| Raw paper (g/m2) |  | 73/74 | 61 |
| Treated paper (g/m2) | 104 | 143/142 | 173 |
| MF resin (g/m2) | 67* | 69/69 | 112 |
| Resin content (%) | 75 | 49/48 | 65 |

*Estimated raw paper 22 g/m2 plus 15 g/m2 of Al2O3 as wear resistant particles.

The core was a 7.6 mm HDF board.
The examples were pressed with the following press conditions:
 Temperature: Oil temperature on upper heating plate 190° C. and 208° C. on the lower heating plate.
 Pressing time: 12 sec
 Pressure: 35 bar After pressing, the impact of the water applied can be studied by comparing the shape of the panels. The counteracting forces formed by the melamine formaldehyde resin of the balancing layer, adapted to counteract and balance the tension formed by the melamine formaldehyde resin of the oppositely arranged overlay and décor layers during curing, increased in the following order:

Example D was more convex in shape than example C, which was equal to example B. Example B was more convex in shape than example A. Consequently, the higher amount of water applied, the larger counteracting forces were formed, thus resulting in a more convex shape of the panel after pressing and curing. Example E was equal to example A in its convex shape.

Example E shows that by spraying the balancing layer and the surface on the core on which the balancing layer is arranged with water, an overlay paper can replace a standard backing paper resulting in an equal convex shape. In example 5, the amount of melamine formaldehyde resin has been reduced from 112 g/m2 to 67 g/m2, corresponding to a reduction of 40%, by replacing the standard backing paper with an overlay paper. The paper weight has been reduced from 61 g/m2 to approximately 22 g/m2. However, the resulting counteracting forces essentially equal a standard backing paper.

Embodiments

1. A method of producing a building panel (1), comprising:
 providing a core (2),
 applying a balancing layer (6) on a first surface (3) of the core (2), wherein the balancing layer (6) has a first moisture content and comprises a B-stage thermosetting binder,
 applying a surface layer (12) on a second surface (4) of the core (2), wherein the surface layer (12) has a second moisture content and comprises a B-stage thermosetting binder,
 adjusting the first moisture content of the balancing layer (6) such that the first moisture content of the balancing layer (6) is higher than the second moisture content of the surface layer (12) prior to curing by applying heat and pressure, and
 curing the thermosetting binder of the surface layer (12) and the balancing layer (6) to C-stage by applying heat and pressure.
2. A method according to embodiment 1, wherein the step of adjusting the first moisture content of the balancing layer comprises applying water or steam to the first surface (3) of the core (2) prior to applying the balancing layer (6).
3. A method according to embodiment 1 or 2, wherein the step of adjusting the first moisture content of the balancing layer comprises applying water or steam to the balancing layer (6).
4. A method according to any one of embodiment 1-3, wherein the first moisture content of the balancing layer (6) is 6-30%, preferably 8-20%, of the total weight of the balancing layer (6) prior to curing by applying heat and pressure.
5. A method according to any one of embodiment 1-4, wherein the balancing layer (6) comprises a resin impregnated sheet, preferably a resin impregnated paper.
6. A method according to any one of embodiment 1-4, wherein the step of applying the balancing layer (6) comprises applying the thermosetting binder in powder form.
7. A method according to any one of embodiment 1-6, wherein the amount of the thermosetting binder in the balancing layer (6) is lower than the amount of the thermosetting binder in the surface layer (12).

The invention claimed is:
1. A method of producing a building panel, comprising:
 providing a core,
 applying a balancing layer on a first surface of the core, wherein the balancing layer has a first moisture content, the balancing layer comprising a sheet,
 applying a surface layer on a second surface of the core, wherein the surface layer has a second moisture content,
 adjusting the first moisture content of the balancing layer such that the first moisture content of the balancing layer is higher than the second moisture content of the surface layer prior to curing by applying heat and pressure, and
 curing the surface layer and the balancing layer by applying heat and pressure to produce the building panel with the surface layer oriented on an upper surface of the core and the balancing layer oriented on a lower surface of the core,
 wherein the surface layer is configured to be a visible surface when the building panel is installed.

2. A method according to claim 1, wherein the step of adjusting the first moisture content of the balancing layer comprises applying water or steam to the first surface of the core prior to applying the balancing layer.

3. A method according to claim 2, wherein the step of adjusting the first moisture content of the balancing layer comprises applying water or steam to the balancing layer.

4. A method according to claim 1, wherein the step of adjusting the first moisture content of the balancing layer comprises applying water or steam to the balancing layer.

5. A method according to claim 1, wherein the first moisture content of the balancing layer exceeds 10% of the total weight of the balancing layer prior to curing.

6. A method according to claim 1, wherein the balancing layer comprises a thermosetting binder.

7. A method according to claim 1, wherein the sheet of the balancing layer is impregnated with a thermosetting binder.

8. A method according to claim 1, wherein the sheet is a paper sheet.

9. A method according to claim 1, wherein the surface layer comprises a thermosetting binder.

10. A method according to claim 1, wherein the balancing layer and the surface layer comprise a thermosetting binder.

11. A method according to claim 10, wherein the thermosetting binder is of the same type in the surface layer and in the balancing layer.

12. A method according to claim 10, wherein the thermosetting binder of the surface layer and/or the balancing layer is melamine formaldehyde resin.

13. A method according to claim 10, wherein the amount of the thermosetting binder in the balancing layer is lower than the amount of the thermosetting binder in the surface layer.

14. A method according to claim 1, wherein the surface layer comprises a décor paper.

15. A method according to claim 1, wherein the surface layer comprises a layer comprising a thermosetting binder and at least one pigment.

16. A method according to claim 1, wherein the first moisture content of the balancing layer exceeds 20% of the total weight of the balancing layer prior to curing.

17. A method according to claim 1, wherein the first moisture content of the balancing layer exceeds 30% of the total weight of the balancing layer prior to curing.

18. A method according to claim 1, wherein the surface layer comprises a resin impregnated décor paper.

19. A method according to claim 1, wherein the surface layer comprises a melamine formaldehyde impregnated décor paper.

20. A method of producing a building panel, comprising:
providing a core;
applying a balancing layer on a first surface of the core, wherein the balancing layer has a first moisture content, wherein the balancing layer comprises a sheet;
applying a surface layer on a second surface of the core, wherein the surface layer has a second moisture content, the surface layer comprising a décor paper which has a decorative print and an overlay layer, the overlay layer being on top of the décor paper and the overlay layer being transparent;
adjusting the first moisture content of the balancing layer such that the first moisture content of the balancing layer is higher than the second moisture content of the surface layer prior to curing by applying heat and pressure; and
curing the surface layer and the balancing layer by applying heat and pressure.

\* \* \* \* \*